US009582219B2

(12) United States Patent
Beam et al.

(10) Patent No.: US 9,582,219 B2
(45) Date of Patent: Feb. 28, 2017

(54) TECHNIQUE FOR RAPIDLY CONVERTING BETWEEN STORAGE REPRESENTATIONS IN A VIRTUALIZED COMPUTING ENVIRONMENT

(71) Applicant: NetApp, Inc., Sunnyvale, CA (US)

(72) Inventors: Steven Beam, Holly Springs, NC (US); John Fullbright, Evans, GA (US)

(73) Assignee: NETAPP, INC., Sunnyvale, CA (US)

( * ) Notice: Subject to any disclaimer, the term of this patent is extended or adjusted under 35 U.S.C. 154(b) by 558 days.

(21) Appl. No.: 13/796,010

(22) Filed: Mar. 12, 2013

(65) Prior Publication Data

US 2014/0281217 A1 Sep. 18, 2014

(51) Int. Cl.
*G06F 3/06* (2006.01)
*G06F 9/455* (2006.01)
*G06F 9/50* (2006.01)

(52) U.S. Cl.
CPC ............. *G06F 3/0646* (2013.01); *G06F 3/067* (2013.01); *G06F 3/0607* (2013.01); *G06F 3/0617* (2013.01); *G06F 3/0661* (2013.01); *G06F 3/0664* (2013.01); *G06F 3/0673* (2013.01); *G06F 9/455* (2013.01); *G06F 9/5077* (2013.01)

(58) Field of Classification Search
CPC .................. G06F 3/067; G06F 9/45533; G06F 2009/4557; G06F 2201/84; G06F 3/0689; G06F 3/0665; G06F 11/1484; G06F 11/1458; G06F 3/0662; G06F 3/065; G06F 3/0647; G06F 9/4856; G06F 17/30174; G06F 9/5077; G06F 2009/45562
See application file for complete search history.

(56) References Cited

U.S. PATENT DOCUMENTS

| | | | |
|---|---|---|---|
| 5,819,292 A | | 10/1998 | Hitz et al. |
| 6,131,192 A | * | 10/2000 | Henry .................. G06F 8/61 707/999.101 |
| 6,857,001 B2 | | 2/2005 | Hitz et al. |

(Continued)

OTHER PUBLICATIONS

Microsoft Virtual Hard Disk Image Format Specification 1.0, Oct. 2006, 17 Pages.

(Continued)

*Primary Examiner* — Reginald Bragdon
*Assistant Examiner* — Thanh Vo
(74) *Attorney, Agent, or Firm* — Klein, O'Neill & Singh, LLP

(57) ABSTRACT

Embodiments described herein provide a storage conversion technique for rapidly converting between storage representations served by a storage system and presented to a host computer of a virtualized computing environment. The storage representations may include physical storage represented by a sequential set of blocks on disks of the storage system that are presented to the host computer in the form of a logical unit number (LUN) and virtual storage represented by a virtual storage device of the storage system that is presented to a hypervisor of the virtualized computing environment in the form of a virtual disk file. Illustratively, the LUN and virtual disk file may be storage objects (e.g., files) having different (file) types and formats in a volume of the storage system; yet each storage object may be organized as a buffer tree having indirect blocks that contain pointers configured to reference data blocks used to store data.

17 Claims, 6 Drawing Sheets

(56) References Cited

U.S. PATENT DOCUMENTS

| | | | |
|---|---|---|---|
| 7,107,385 B2 | 9/2006 | Rajan et al. | |
| 7,409,494 B2 | 8/2008 | Edwards et al. | |
| 7,577,722 B1 | 8/2009 | Khandekar et al. | |
| 7,933,872 B2 | 4/2011 | Kulkarni et al. | |
| 8,041,888 B2 | 10/2011 | Rajan et al. | |
| 8,281,066 B1 | 10/2012 | Trimmer et al. | |
| 8,332,847 B1 | 12/2012 | Hyser et al. | |
| 8,352,608 B1 | 1/2013 | Keagy et al. | |
| 8,417,938 B1 | 4/2013 | Considine et al. | |
| 8,458,717 B1 | 6/2013 | Keagy et al. | |
| 8,825,940 B1* | 9/2014 | Diggs | G06F 13/28 711/103 |
| 9,177,337 B2 | 11/2015 | Hing | |
| 2005/0216532 A1* | 9/2005 | Lallier | G06F 3/0605 |
| 2006/0089992 A1 | 4/2006 | Blaho | |
| 2007/0220248 A1 | 9/2007 | Bittlingmayer et al. | |
| 2009/0172664 A1 | 7/2009 | Mostafa | |
| 2009/0228629 A1 | 9/2009 | Gebhart et al. | |
| 2010/0250630 A1* | 9/2010 | Kudo | G06F 3/0607 707/822 |
| 2010/0281467 A1 | 11/2010 | Arteaga et al. | |
| 2010/0293349 A1* | 11/2010 | Lionetti | G06F 3/0689 711/162 |
| 2011/0022694 A1 | 1/2011 | Dalal et al. | |
| 2011/0078395 A1 | 3/2011 | Okada et al. | |
| 2011/0126269 A1 | 5/2011 | Youngworth | |
| 2011/0131576 A1 | 6/2011 | Ikegaya et al. | |
| 2011/0307889 A1 | 12/2011 | Moriki et al. | |
| 2012/0011193 A1 | 1/2012 | Gilboa | |
| 2012/0011280 A1 | 1/2012 | Gilboa | |
| 2012/0011445 A1 | 1/2012 | Gilboa | |
| 2012/0144391 A1 | 6/2012 | Ueda | |
| 2012/0151476 A1 | 6/2012 | Vincent | |
| 2012/0197772 A1 | 8/2012 | Hing | |
| 2012/0221699 A1 | 8/2012 | Moriyasu et al. | |
| 2012/0233282 A1 | 9/2012 | Voccio et al. | |
| 2012/0278804 A1 | 11/2012 | Narayanasamy et al. | |
| 2013/0139153 A1 | 5/2013 | Shah | |
| 2013/0139155 A1 | 5/2013 | Shah | |
| 2013/0152078 A1 | 6/2013 | Arcilla et al. | |
| 2013/0185715 A1 | 7/2013 | Dunning et al. | |
| 2013/0232474 A1 | 9/2013 | Leclair et al. | |
| 2013/0247136 A1 | 9/2013 | Chieu et al. | |
| 2013/0275596 A1 | 10/2013 | Subramaniam | |
| 2013/0275971 A1 | 10/2013 | Kruglick | |
| 2013/0326505 A1 | 12/2013 | Shah | |
| 2013/0339956 A1 | 12/2013 | Murase et al. | |
| 2014/0007092 A1 | 1/2014 | Barbee et al. | |
| 2014/0007093 A1 | 1/2014 | Deshpande et al. | |
| 2014/0032753 A1 | 1/2014 | Watanabe et al. | |
| 2014/0075437 A1 | 3/2014 | Mousseau | |
| 2014/0137114 A1 | 5/2014 | Bolte et al. | |
| 2014/0165063 A1 | 6/2014 | Shiva et al. | |
| 2014/0172406 A1 | 6/2014 | Baset et al. | |
| 2014/0196030 A1 | 7/2014 | Deshpande et al. | |
| 2014/0223435 A1 | 8/2014 | Chang | |
| 2014/0245292 A1 | 8/2014 | Balani et al. | |
| 2014/0344807 A1 | 11/2014 | Bursell et al. | |
| 2014/0359610 A1 | 12/2014 | Tian et al. | |
| 2015/0052521 A1 | 2/2015 | Raghu | |
| 2015/0106809 A1 | 4/2015 | Reddy et al. | |
| 2015/0109923 A1 | 4/2015 | Hwang | |
| 2015/0113530 A1 | 4/2015 | Arcese et al. | |
| 2015/0113531 A1 | 4/2015 | Lv et al. | |
| 2015/0154039 A1 | 6/2015 | Zada et al. | |
| 2015/0178113 A1 | 6/2015 | Dake | |
| 2015/0242225 A1 | 8/2015 | Muller et al. | |
| 2015/0324216 A1 | 11/2015 | Sizemore et al. | |
| 2015/0324217 A1 | 11/2015 | Shilmover et al. | |
| 2016/0019087 A1 | 1/2016 | Hing | |

OTHER PUBLICATIONS

Non-final Office Action mailed Aug. 13, 2015 for U.S. Appl. No. 14/296,695, filed Jun. 5, 2015, 21 pages.

Non-final Office Action mailed Feb. 9, 2016, for U.S. Appl. No. 14/296,695, filed Jun. 5, 2015, 26 pages.

Final Office Action mailed Aug. 11, 2016 for U.S. Appl. No. 14/296,695.

Non-final Office Action mailed Oct. 6, 2016 for U.S. Appl. No. 14/503,338.

Whitehouse L., et al., "Amazon Web Services: Enabling Cost-Efficient Disaster Recovery Leveraging Cloud Infrastructure", Enterprise Strategy Group, White Paper, Jan. 2012, 16 pages.

* cited by examiner

TECHNIQUE FOR RAPIDLY CONVERTING BETWEEN STORAGE REPRESENTATIONS IN A VIRTUALIZED COMPUTING ENVIRONMENT

BACKGROUND

Technical Field

The present disclosure relates to virtualized computing environments and, more specifically, to physical-to-virtual, and virtual-to-physical, storage conversion in a virtualized computing environment.

Background Information

A physical machine environment may include a host computer, such as a desktop, laptop or server, having computing resources, such as processing elements and/or logic circuitry, configured to execute operations that functionally organize the computer. The computing resources may be further configured to execute software programs and/or process data stored on one or more storage devices, such as disks, attached to a storage system. The software programs and/or data may be stored on physical storage represented by a sequential set of blocks on the disks that are presented to the host computer in the form of a logical unit number (LUN).

It may be desirable to virtualize the physical machine environment to, e.g., enable sharing of the computing resources of the host computer. In such a virtualized computing environment, the host computer may be configured to execute a virtual machine operating system as well as one or more "guest" operating systems to essentially implement virtual machines on the computer. The virtual machine operating system may include a virtualization layer or module ("hypervisor") configured to mask low-level hardware operations from one or more guest operating systems executing on the virtual machine operating system. As used herein, a hypervisor is a virtualization platform that permits the guest operating systems (or portions of a guest operating system) to execute on the host computer at the same time.

When virtualizing the physical machine environment, it may be necessary to convert the physical storage presented to the host computer into virtual storage represented by a virtual storage device that is presented to the hypervisor in the form of a virtual disk file. Such physical-to-virtual storage conversion involves converting the disks attached to the host computer from the LUN representation into a proper virtual disk file representation having a format compatible with the hypervisor. A known process for performing this storage conversion essentially involves copying, e.g., by the storage system, of data from the LUN into the virtual disk file. That is, the conversion process includes creating the virtual disk file, reading each block of the LUN and writing each read block to the file. The process then completes by writing a header and footer that configure the virtual disk file to a proper format for the hypervisor. However, this process is generally time consuming and idle intensive, and places substantial load on the storage system.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Overview

Embodiments described herein provide a storage conversion technique for rapidly converting between storage representations served by a storage system and presented to a host computer of a virtualized computing environment. The storage representations may include physical storage represented by a sequential set of blocks on disks of the storage system that are presented to the host computer in the form of a logical unit number (LUN) and virtual storage represented by a virtual storage device of the storage system that is presented to a hypervisor of the virtualized computing environment in the form of a virtual disk file. Illustratively, the LUN and virtual disk file may be storage objects (e.g., files) having different (file) types and formats in a volume of the storage system; yet each storage object may be organized as a buffer tree having indirect blocks that contain pointers configured to point to (reference) data blocks used to store data.

In one or more embodiments, the storage conversion technique determines locations of data blocks within a source storage object (e.g., the LUN) and calculates a range of those data blocks for the source storage object. Similarly, the technique calculates and reserves one or more ranges of data blocks on the disks for a destination storage object (e.g., the virtual disk file). Thereafter, the technique manipulates (i.e, copies) the pointers directed to the range of data blocks for the source storage object so as to also reference the one or more ranges of data blocks for the destination storage object in accordance with, e.g., physical-to-virtual storage conversion. In addition, the technique may copy the pointers directed to the one or more ranges of data blocks for a source storage object (e.g., the virtual disk file) so as to also reference the range of data blocks for a destination storage object (e.g., the LUN) in accordance with, e.g., virtual-to-physical storage conversion.

Advantageously, the technique provides fast and efficient storage conversion that obviates copying, i.e., reading and writing, of data blocks. That is, instead of reading each data block from the source storage object and writing each read data block to the destination storage object in a proper format, the storage conversion technique described herein copies the pointers directed to the data blocks of the source storage object to also reference (and share) those data blocks at the destination storage object. As a result, the storage conversion technique substantially reduces input/output operations of the storage system by, e.g., consuming little-to-no additional storage on the system.

DESCRIPTION

Figure 1:
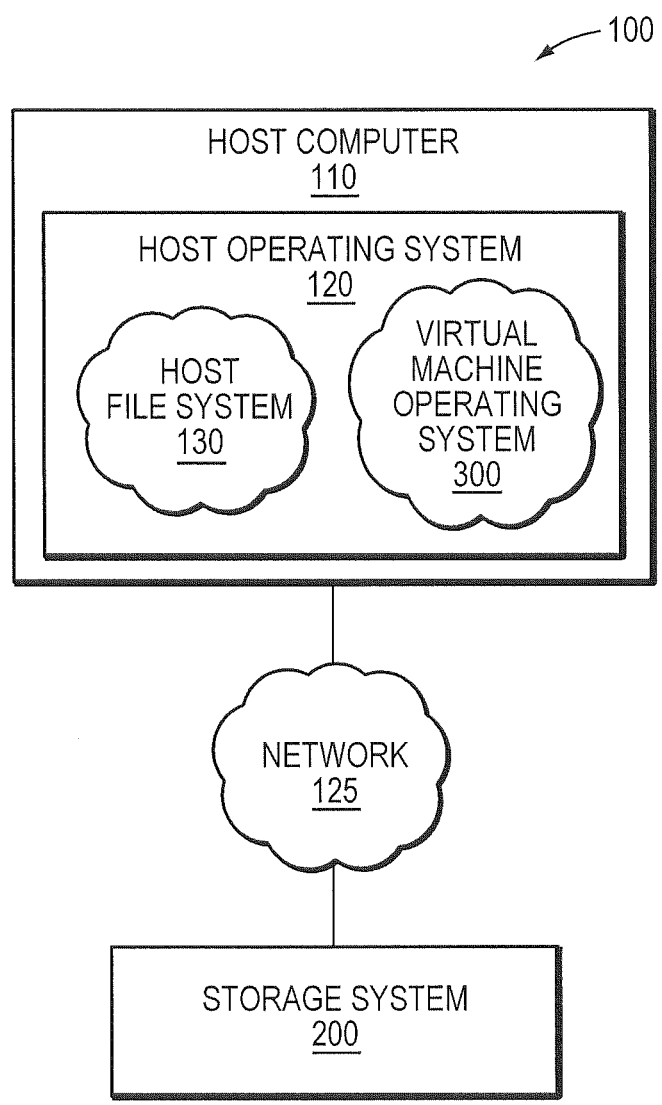
FIG. 1 is a block diagram of a virtualized computing environment.

FIG. 1 is a schematic block diagram of a virtualized computing environment 100 that may be advantageously used with one or more embodiments described herein. The virtualized computing environment 100 illustratively includes a host computer 110 coupled to a storage system 200 over a network 125. The host computer 110 may be a general-purpose computer having processing elements and/or logic circuitry configured to execute software code, including a host operating system 120 executing a virtual machine operating system 300, and manipulate data structures. In an embodiment, the host operating system 120 may be embodied as the Microsoft Windows operating system that implements a host file system 130, such as the NTFS file system; however, it should be noted that other types of operating systems and file systems, such as the Linux operating system and file system, e.g, EXT3, may be used in accordance with the embodiments described herein.

The host computer 110 may communicate with the storage system 200 over network 125 by exchanging discrete frames or packets of data according to pre-defined protocols, such as the Transmission Control Protocol/Internet Protocol (TCP/IP). The network 125 may include a point-to-point connection or a shared medium, such as a local area network (LAN) or wide area network (WAN). Illustratively, the network 125 may be embodied as an Ethernet network or a Fibre Channel (FC) network.

In addition, the host computer 110 may be configured to interact with the storage system 200 in accordance with a client/server model of information delivery. That is, the host computer (i.e., client) may request the services of the storage system, and the storage system may return the results of the services requested by the host computer, by exchanging packets over the network 125. The host computer 110 may issue packets including file-based access protocols, such as the Common Internet File System (CIFS) protocol or Network File System (NFS) protocol, over TCP/IP when accessing information in the form of files and directories. Alternatively, the host computer may issue packets including block-based access protocols, such as the Small Computer Systems Interface (SCSI) protocol encapsulated over TCP (iSCSI) and SCSI encapsulated over FC (FCP), when accessing information in the form of blocks and/or logical unit numbers (LUNs).

Figure 2:
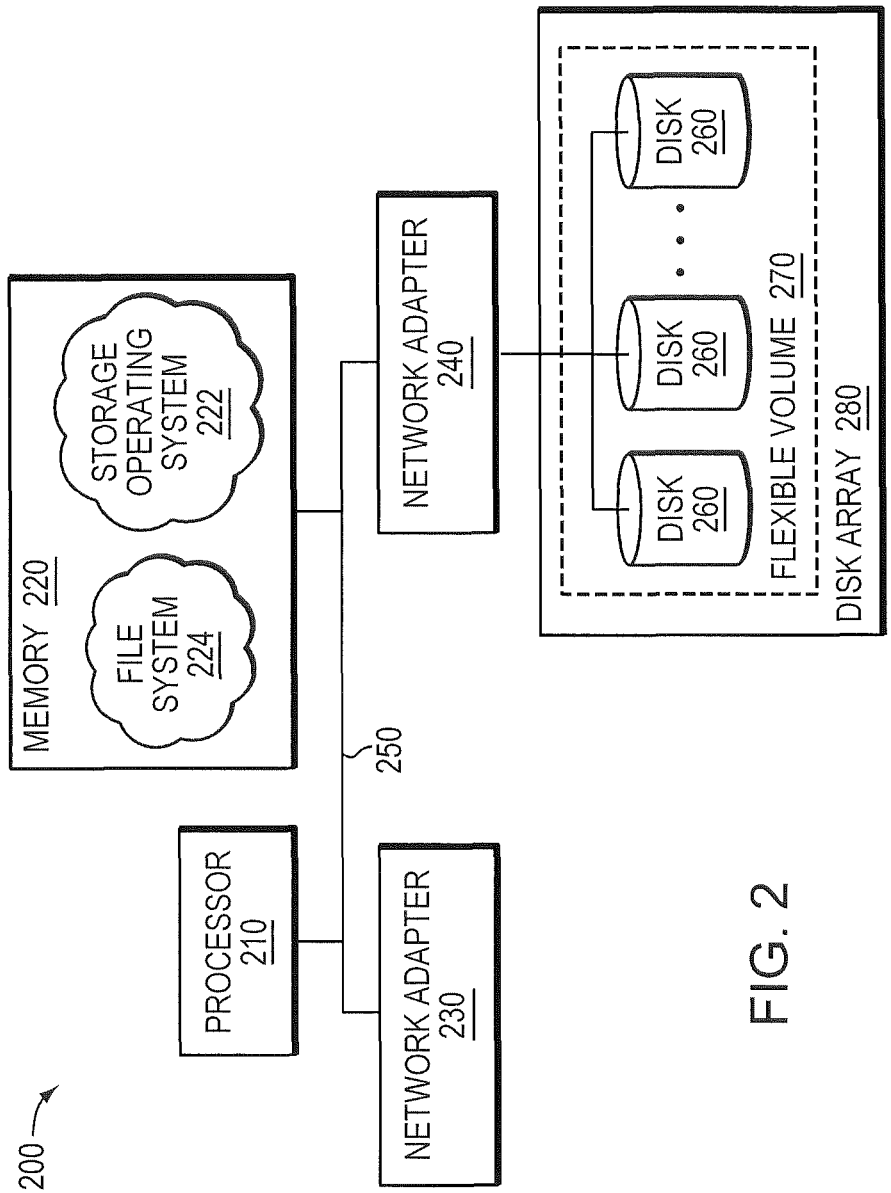
FIG. 2 is a block diagram of a storage system of the virtualized computing environment.

FIG. 2 is a block diagram of storage system 200 that may be advantageously used with one or more embodiments described herein. The storage system 200 is illustratively embodied as a computer configured to provide storage service relating to the organization of information on storage devices, such as disks 260 of a disk array 280. The storage system 200 may include a processor 210, a memory 220, one or more network adapters 230 and a storage adapter 240 interconnected by a system bus 250. Each network adapter 230 includes the mechanical, electrical and signaling circuitry needed to connect the storage system 200 to the host computer 110 over the network 125. The storage system 200 may also include a storage operating system 222 that may illustratively implement a high-level module, such as a file system 224, to logically organize the information as storage objects on the disks.

The memory 220 includes a plurality of storage locations addressable by the processor and/or adapters for storing software programs (e.g., processes and/or services) and data structures associated with the embodiments described herein. The processor and adapters may, in turn, include processing elements and/or logic circuitry configured to execute the software programs and manipulate the data structures. Storage operating system 222, portions of which are typically resident in the memory 220 and executed by the processor 210, functionally organizes the storage system 200 by, inter alia, invoking operations in support of the software processes and/or services executing on the system. It will be apparent to those skilled in the art that other processing and memory means, including various computer readable media, may be used for storing and executing program instructions pertaining to the embodiments described herein.

The storage adapter 240 may cooperate with the storage operating system 222 executing on the storage system 200 to access (e.g., retrieve via a read operation or store via a write operation) information requested by the host computer 110. The storage adapter 240 may include I/O interface circuitry that couples to the disks 260 over an I/O interconnect arrangement, such as a conventional high-performance, FC serial link topology. The information may be retrieved or stored on disk 260 by the storage adapter and, upon completion, either the retrieved information or an acknowledgement (generated by the processor 210 or the adapter 240) may be forwarded over the bus 250 to the network adapter 230, where it is formatted into one or more packets or messages and forwarded over the network 125 to the host computer 110.

Storage of information on disk array 280 may be implemented as storage "volumes" that are illustratively embodied as virtual volumes and further organized as one or more aggregates of the array. Aggregates and virtual volumes are disclosed and described in U.S. Pat. No. 7,409,494 titled Extension of Write Anywhere File System Layout, by John K. Edwards et al. and issued on Aug. 5, 2008. Briefly, an aggregate includes one or more groups of disks, such as Redundant Array of Independent (or Inexpensive) Disks (RAID) groups, that are apportioned by the file system 224 into one or more virtual volumes (hereinafter flexible volumes 270) of the storage system. Each flexible volume has its own logical properties, utilizes algorithms of the file system implementation and serves storage objects, such as files with different file types and formats. An example of a file type of a storage object is a virtual disk (vdisk) that may be exported as a LUN, e.g., to host computer 110.

Briefly, the vdisk has a special file type that derives from a plain (regular) file, but that has associated export controls and operation restrictions that support emulation of a disk. Illustratively, the vdisk is a multi-inode object including a special file inode (i.e., a lun inode) and at least one associated stream inode that are managed as a single "encapsulated" storage object within the file system 224. The lun inode functions as a main container for storing data associated with the emulated disk. To that end, the lun inode includes a data section that may store the actual data or pointers referencing data blocks on disk used to store the data. The data stored in this container can be retrieved (read) and stored (written) by the host computer 110 using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The stream inode functions as a persistent store for storing various attributes, such a geometry information, which allow the vdisk to be exported as a LUN. The geometry information pertains to the physical geometry of the vdisk needed for emulation of the LUN. For example, the vdisk size (as provided by, e.g., the host computer) may be algorithmically converted to geometry information (e.g., cylinder size), which may be returned to host computer as representative of the LUN. An on-disk representation of a vdisk for a file system is disclosed and described in U.S. Pat. No. 7,107,385 titled Storage Virtualization by Layering Virtual Disk Objects on a File System, by Vijayan Rajan et al. and issued on Sep. 12, 2006.

In an embodiment, the storage operating system 222 is illustratively the NetApp® Data ONTAP™ operating system available from NetApp, Inc., Sunnyvale, Calif. that implements a Write Anywhere File Layout (WAFL™) file system 224. Illustratively, the WAFL file system has an on-disk format representation that is block-based using, e.g., 4 kilobyte (kB) blocks and using index nodes ("inodes") to identify files and file attributes (such as creation time, access permissions, size and block location). The file system 224 uses files to store meta-data describing the layout of its file system; these meta-data files include, among others, an inode file. A file handle, i.e., an identifier that includes an inode number, is used to retrieve an inode from disk. Although the embodiments herein are directed to the WAFL file system, it is expressly contemplated that any appropriate storage operating system and/or file system may be enhanced for use in accordance with the technique described herein. As such, where the term "WAFL" is employed, it should be taken broadly to refer to any file system that is otherwise adaptable to the disclosure herein.

Figure 3:
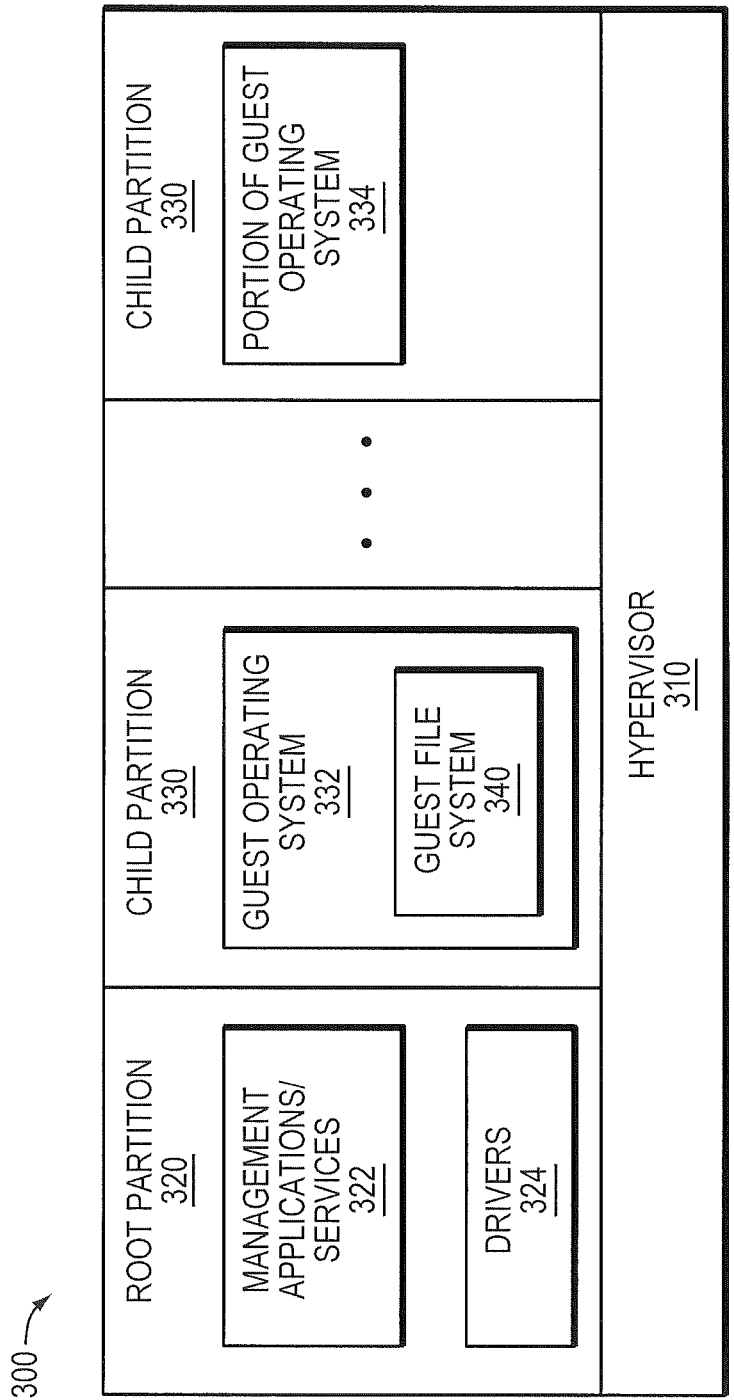
FIG. 3 is a block diagram of a virtual machine operating system executing on the virtualized computing environment.

FIG. 3 is a block diagram of a virtual machine operating system 300 that may be advantageously used with one or more embodiments disclosed herein. The virtual machine operating system 300 may include virtual machine operating systems available from Xen, VMware, Linux Kernel Virtual Machine (LKVM) and the like. However, as described herein, the virtual machine operating system 300 is illustratively the Microsoft virtual machine operating system including, e.g., a Microsoft Windows Server. The virtual machine operating system 300 includes a virtualization layer or module ("hypervisor 310") configured to mask low-level hardware operations from one or more guest operating systems executing on the virtual machine operating system 300. As used herein, a hypervisor is a virtualization platform that permits the guest operating system (or portions of a guest operating system) to execute on the host computer 110 at the same time. In an embodiment, the hypervisor 310 is illustratively the Hyper-V hypervisor, although other types of hypervisors, such as the Xen hypervisor and/or VMware ESX hypervisor, may be used in accordance with the embodiments described herein.

Illustratively disposed over the hypervisor module 310 is a plurality of domains or partitions, for example, a root partition 320 and one or more child partitions 330. The root partition 320 provides administrator functionality and, as such, may execute a guest operating system based kernel and/or one or more administrative modules, such as management applications/services 322. The root partition 320 may also include, for example, a plurality of software drivers 324 adapted to interface with various hardware components of the host computer including, for example, network and/or storage adapters. The drivers 324 illustratively provide an interface for input/output (I/O) operations issued by the guest operating system 332.

The child partition 330 is representative of a virtual machine within which the guest operating system 332 (or a portion of a guest operating system 334) executes. In an embodiment, the guest operating system 332 may be embodied as the Microsoft Windows operating system that implements a guest file system 340, such as the NTFS file system; however, it should be noted that other types of guest operating systems and file systems, such as the Linux operating system and file system, e.g. EXT3, may be used in accordance with the embodiments described herein. As such, the description of the Microsoft Windows operating system and NTFS file system should be taken as exemplary only.

Embodiments described herein provide a storage conversion technique for rapidly converting between storage representations served by the storage system 200 and presented to the host computer 110 of the virtualized computing environment 100. The is storage representations may include physical storage represented by a sequential set of blocks on disks 260 of the storage system 200 that are presented to the host computer 110 in the form of a LUN and virtual storage represented by a virtual storage device of the storage system that is presented to the hypervisor 310 in the form of a virtual disk file. Illustratively, the LUN and virtual disk file may be storage objects (e.g., files having different file types and formats) in a volume, such as flexible volume 270, of the storage system 200; yet each storage object may be organized as a buffer tree having indirect blocks that contain pointers configured to point to (reference) data blocks used to store data.

Figure 4:
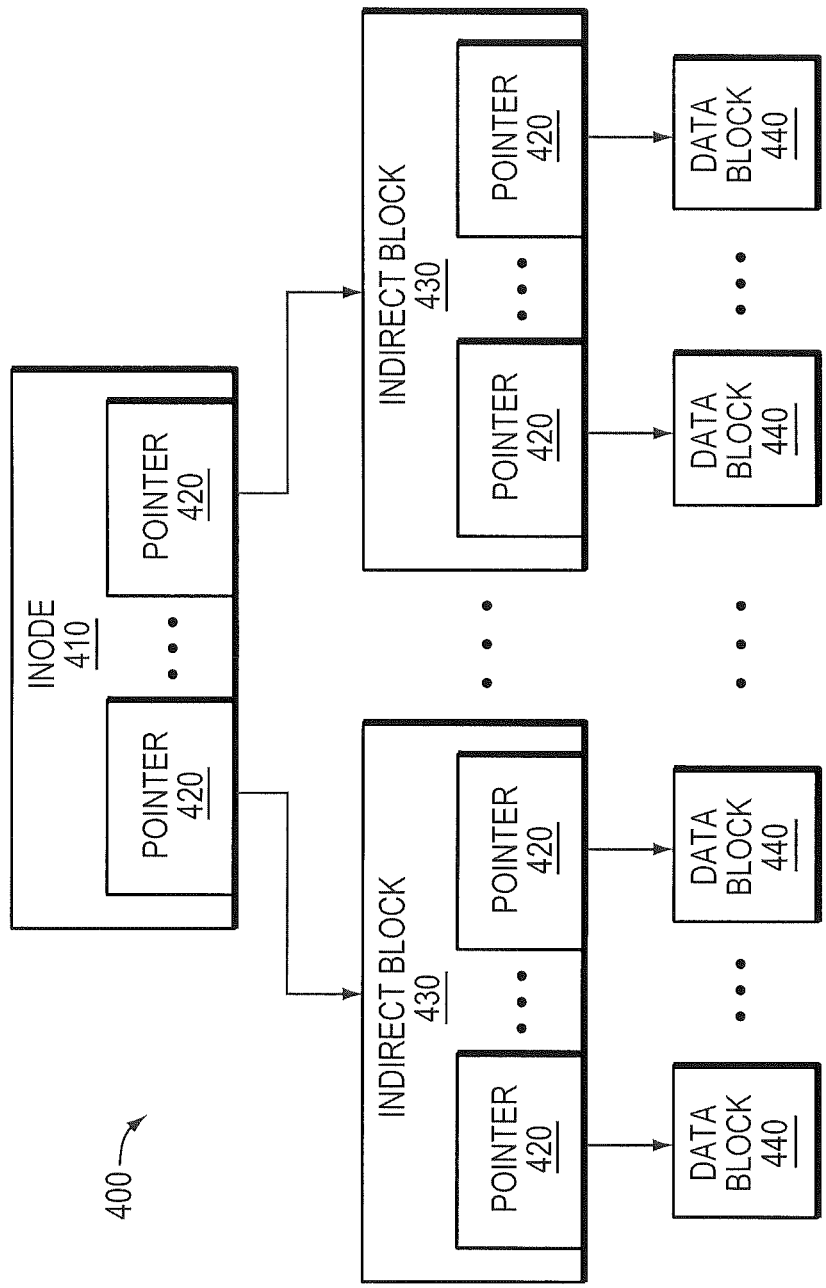
FIG. 4 is a block diagram of a buffer tree of a storage object of the virualized computing environment.

FIG. 4 is a block diagram of a buffer tree 400 of a storage object of the virualized computing environment 100 that may be advantageously used with one or more embodiments disclosed herein. The buffer tree 400 is an internal representation of blocks for the storage object (e.g., a LUN or virtual disk file) loaded into the memory 220 of the storage system 200 and maintained by the file system 224. A file root inode 410 references indirect (e.g., level 1) blocks 430. For example, in the case of the LUN, the file root inode 410 is a lun inode having a file type of vdisk. The indirect blocks (and inode) contain pointers 420 that ultimately reference data blocks 440 used to store the actual data of storage object 400. That is, the data of storage object 400 are contained in data blocks 440 and the locations of these blocks are stored in the indirect blocks 430 of the object. Illustratively, each indirect block 430 may contain pointers to as many as 1024 data blocks. According to the "write anywhere" nature of the file system 224, these blocks may be located anywhere on the disks 260.

In one or more embodiments, the storage conversion technique may be implemented in the form of commands that are executed on the host operating system 120 (e.g., the Window operating system) of host computer 110 and that invokes host file system calls (e.g., NTFS file system calls) that enable communication with the storage system 200. For example, execution of a first command at the host computer that is used to convert the LUN into the virtual disk file having, e.g., a virtual hard disk (VHD) file format results in physical-to-virtual storage conversion on the storage system is (illustratively the "Virtual Hard Disk Image Format Specification 1.0, October 2006" available from Microsoft). Here, the storage conversion technique determines locations of data blocks and pointers to those blocks within a source storage object (e.g., the source LUN) in a flexible volume 270 of the storage system, and calculates a range of those data blocks for the source storage object. Similarly, execution of the first command results in the technique calculating and reserving one or more ranges of data blocks on the disks for a destination storage object (e.g., the virtual disk file) on a destination LUN in the same flexible volume 270. To that end, the first command illustratively includes, inter alia, a parameter specifying the storage system 200 containing the source LUN to be converted, a parameter specifying a path of the source LUN, common parameters indicating a size and operating system (OS) type of the source LUN, and a parameter specifying a fully-qualified path to the virtual disk file, e.g., a virtual hard disk (VHD) file on the destination LUN which, when created, contains the source LUN data once the conversion process has completed.

It should be noted an NTFS file system is illustratively disposed on the destination LUN. In other words, the destination LUN has a destination NTFS file system that is used by the host computer; the VHD file is created on this destination LUN. Thus, execution of the first command also results in creation of the VHD file by, e.g., creating an empty file on the destination LUN in the flexible volume 270 on the storage system 200 having a size equal to that of the source LUN. The size of the source LUN may be determined using one or more appropriate storage operating system commands.

In an embodiment, the first command is illustratively a ConvertTo-NaVhd command that is used to convert the source LUN into the VHD file format and that includes the following exemplary syntax:

ConvertTo-NaVhd -SourceLun <String> [[-DestinationVhd] <String>] [-Controller <AbstractController>] [<CommonParameters>]

is wherein the SourceLun parameter specifies the path of the source LUN to be converted, the DestinationVhd parameter specifies a fully-qualified path to the VHD file on the destination LUN, the Controller parameter specifies the storage system 200 containing the source LUN to be converted and containing connection context needed to execute commands on the storage operating system 222, and the CommonParameters indicate other commonly used parameters, such as, for example common parameters of Microsoft Windows PowerShell cmdlets (detailed at http://technet.microsoft.com/end-us/library/hh847884.aspx).

In an alternative embodiment, the first command (ConvertTo-NaVhd) may include the following syntax:

ConvertTo-NaVhd -SourceDiskIndex <UInt32> [[-DestinationVhd] <String>] [-Controller <AbstractController>] [<CommonParameters>]

wherein a SourceDiskIndex parameter is used instead of the SourceLun parameter. In this alternative embodiment, the SourceDiskIndex parameter specifies a Virtual Disk Service (VDS) disk index of the disk to convert; the first command executes a SCSI inquiry command to retrieve the source LUN path from the storage system. Note that the DestinationVhd, Controller, and CommonParameters function as indicated above.

Figure 5:
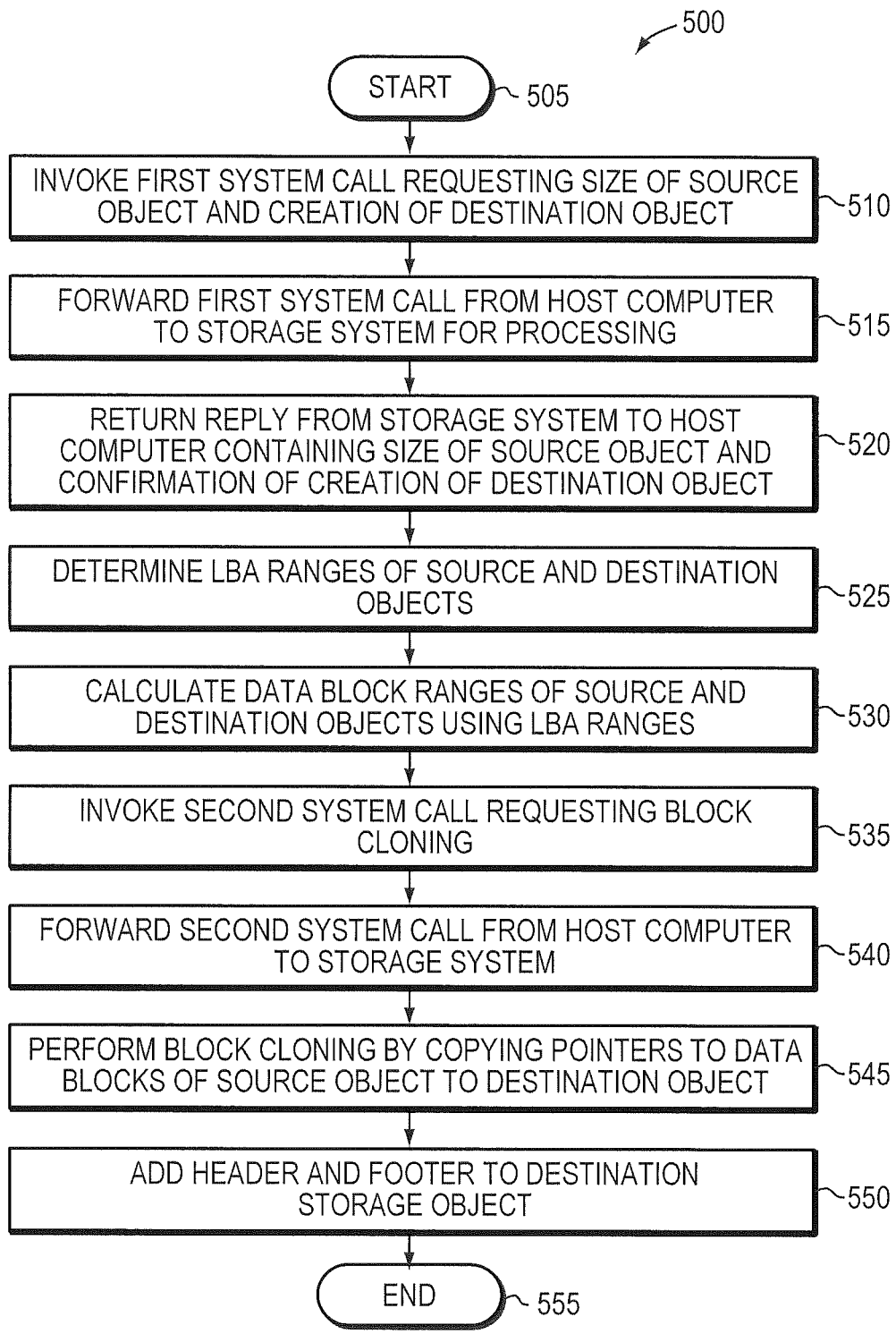
FIG. 5 is an example simplified procedure for converting between storage representations served by the storage system and presented to a host computer of the virtualized computing environment in accordance with a storage conversion technique.

FIG. 5 is an example simplified procedure for rapidly converting between storage representations served by the storage system and presented to the host computer of the virtualized computing environment in accordance with the storage conversion technique. The procedure 500 starts at step 505 and proceeds to step 510 where a first system call requesting a size of a source storage object (e.g., the source LUN) and creation of a destination storage object (e.g., VHD file) is invoked at the host computer 110. Illustratively, the first system call is a NTFS system call that is invoked by execution of the first command having parameters that define the requested information. At step 515, the system call is forwarded from the host computer 110 as one or more packets over the network 125 and onto the storage system 200 for processing.

In an embodiment, the packet is received at the network adapter 230 of the storage system and forwarded to the file system 224. The file system may generate is operations to load (retrieve) the information needed to satisfy the request from disk if it is not resident "in core", i.e., in the memory 220. If the information is not in the memory, the file system 224 may index into the inode file using an inode number to access an appropriate entry (e.g., the lun inode of the source LUN) and retrieve a virtual volume block number (vvbn) that is then mapped to a disk identifier and physical virtual block number (disk,pvbn) and sent to an appropriate driver (e.g., SCSI) of the storage operating system. The driver accesses the pvbn from the specified disk and loads the requested data blocks, as well as the appropriate pointers, in the memory 220 for processing, e.g., calculation of the size of the source LUN and determination of the OS type of the source LUN, by the processor 210 of the storage system. Upon completion of processing, the storage system 200 returns a reply containing, e.g., the calculated source storage object size, determined OS type, and confirmation of creation of the destination storage object to the host computer 110 over the network 125 (step 520).

In response to receiving the reply, the (NTFS) host file system 130 on the host computer 110 may be consulted to determine the logical block address (LBA) range of the source storage object and the one or more LBA ranges of the destination storage object (step 525). Illustratively, the source storage object (i.e., source LUN) is considered to have a single LBA block range starting at zero with a length of the size of the LUN. However, the destination storage object (i.e., the VHD file) may have one or more LBA ranges. In an embodiment, the host file system 130 determines these LBA ranges by issuing an NTFS system call to fetch a cluster map from the destination NTFS file system. That is, the LBA ranges may be calculated using the cluster map. Broadly stated, NTFS file system refers to a logical arrangement of data, i.e. in a format, at physical locations on disk, such as sectors, using logical cluster numbers (LCNs) that reference units of storage or "clusters". The cluster map is a structure having a starting LCN and an array of LCNs having a uniform cluster size. The cluster size may be determined based on the number of sectors per cluster. Thereafter, the cluster map may be converted to LBA ranges, wherein the LCNs correspond one-to-one to LBAs. For example, assume a sector is 512 bytes and that there are 2 sectors per cluster, such that is the cluster size is 1 kbytes. Therefore, each LCN of the cluster map has a size of 1 kbytes and maps to a 1 kbytes LBA.

At step 530, the host file system 120 uses the LBA ranges of the destination storage object in conjunction with the LBA range of the source storage object to calculate data block ranges of the source and destination storage objects to supply to the storage system 200. The storage operating system 222 maintains a mapping between the calculated block ranges of the destination storage object and the calculated block range of the source object. The mapping includes a set of entries each corresponding to a mapping of one of the source calculated block ranges. In an embodiment, the mapping may be stored as a file of the file system 224.

Once the data block ranges have been calculated, a second system call is invoked that requests initiation of block cloning (step 535). At step 540, the second system call is forwarded from the host computer 110 as one or more packets over the network 125 and onto the storage system 200. At step 545, the storage operating system 222 performs the block cloning by, e.g., manipulating (i.e, copying) the pointers directed to the range of data blocks for the source storage object (i.e., the source LUN) so as to also reference the one or more ranges of data blocks for the destination storage object (i.e., the VHD file) in accordance with, e.g., physical-to-virtual storage conversion. In an embodiment, the logical order of the data blocks in the source storage object is maintained in the destination storage object. The procedure then ends at step 550, in which the storage operating system 222 adds header and/or footer information to the VHD file according to the format, e.g. VHD, as indicated by the command, e.g. ConvertTo-NaVhd, such that the resulting destination storage object (i.e., VHD file) is ready for use.

Figure 6:
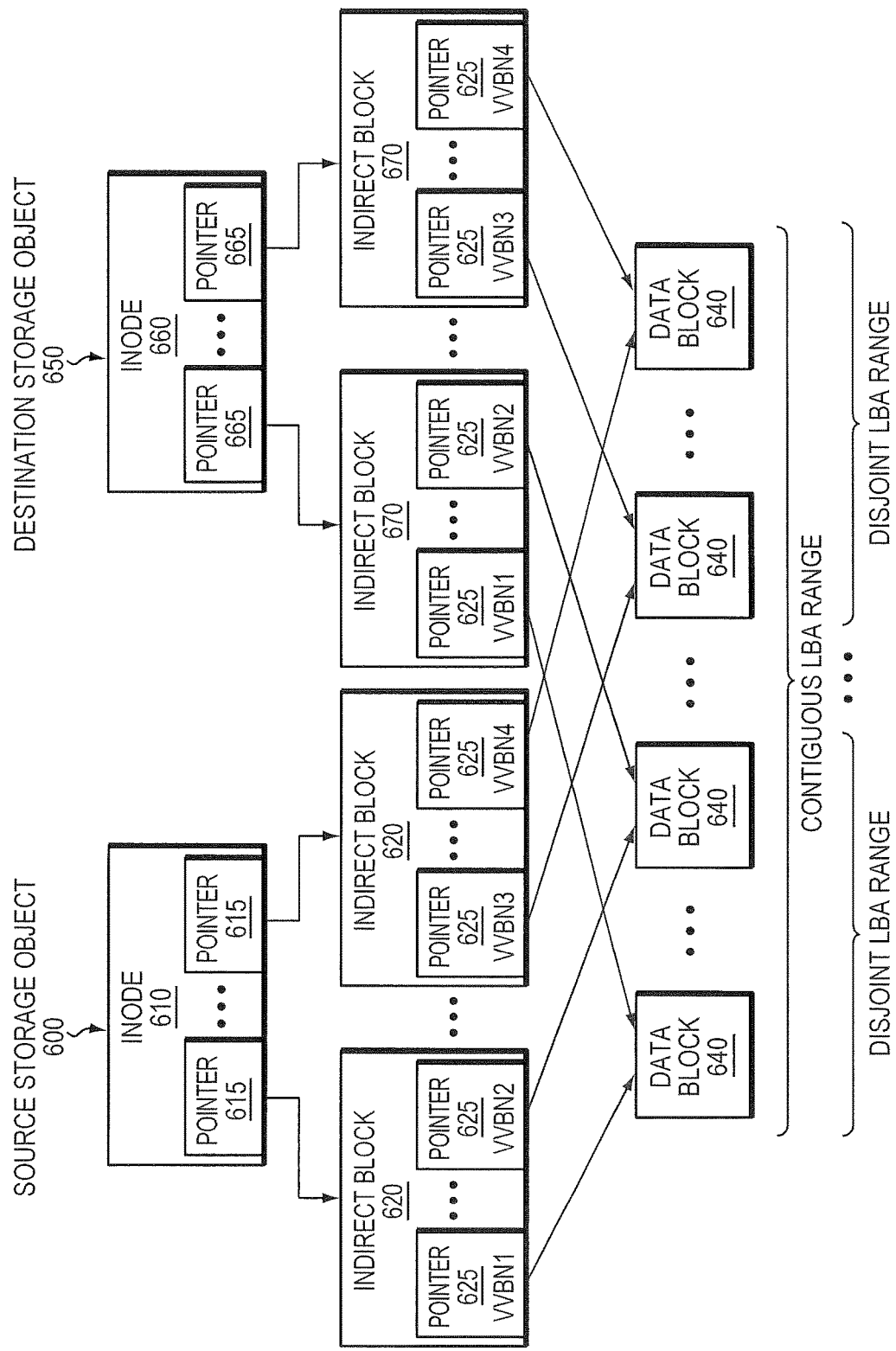
FIG. 6 is a block diagram of a block cloning mechanism of the storage conversion technique.

FIG. 6 is a block diagram of a block cloning mechanism that may be advantageously used with one or more embodiments disclosed herein. A buffer tree of the source LUN (source storage object 600), which is loaded into the memory 220 of the storage system 200, includes a file root (lun) inode 610 containing pointers 615 that reference one or more indirect blocks 620, each of which contain pointers 625 that reference data blocks 640 used to store the actual data of the source storage object 600. As noted, execution of the first command in accordance with the storage conversion technique creates the VHD file (destination storage object 650) on a destination LUN. The VHD file is illustratively loaded into memory 220 as a "shell" file having a file root inode 660 containing pointers 665 that reference one or more indirect blocks 670. Illustratively, each pointer 665 corresponds to a mapping entry in the mapping file. In accordance with the block cloning mechanism, the file system 224 copies the pointers 625 of indirect blocks 620 from the source storage object 600 to indirect blocks 670 of the destination storage object 650, to thereby enable the destination storage object 650 to reference (and share) the same data blocks 640 as the source storage object 600. A reference counter included in a block reference count file is also incremented indicating the associated data block is in "use" by an additional storage object (the destination storage object 650). A file system block reference count technique is further described in commonly owned U.S. Pat. No. 8,281,066 titled SYSTEM AND METHOD FOR REAL-TIME DEDUPLICATION UTILIZING AN ELECTRONIC STORAGE MEDIUM to Trimmer et al., issued on Oct. 2, 2012.

In an embodiment, the guest operating system 332 may store modified data in the destination VHD while unmodified data in the source LUN is preserved. That is the VHD file and the LUN are permitted to diverge.

In an embodiment, execution of a second command at the host computer that is used to convert the LUN into the virtual disk file having, e.g., a VHDX file format also results in physical-to-virtual storage conversion on the storage system (illustratively the "VHDX format specification 1.0, August 2012" available from Microsoft). The storage conversion technique determines locations of data blocks and pointers to those blocks within the source storage object (e.g., the source LUN) in a flexible volume 270 of the storage system, and calculates a range of those data blocks for the source storage object. Execution of the second command results in the technique calculating and reserving one or more ranges of data blocks on the disks for the destination storage object (e.g., the VHDX file) on a destination LUN in the same flexible volume 270. To that end, the second command illustratively includes, inter alia, a parameter specifying the storage is system 200 containing the source LUN to be converted, a parameter specifying a path of the source LUN, and common parameters indicating a size and OS type of the source LUN. The second command also includes a parameter specifying a fully-qualified path to the virtual disk file, e.g., a VHDX file on the destination LUN which, when created, contains the source LUN data once the conversion process has completed, and a parameter specifying a block size to use when creating the VHDX file. Illustratively, the value of the block size parameter may be a power of two between 1 MB and 256 MB. Thus, execution of the second command also results in creation of the VHDX file by, e.g., creating an empty file on the destination LUN in the flexible volume 270 on the storage system 200 having a size equal to that of the source LUN. Note that a VHDX Block Allocation Table may be used to determine the region of the VHDX file which contains the data.

In an embodiment, the second command is illustratively a ConvertTo-NaVhdx command that is used to convert the LUN into the VHDX file format and that includes the following exemplary syntax:

ConvertTo-NaVhdx -SourceLun <String> [[-DestinationVhdx] <String>] [-BlockSize <String>] [-Controller <AbstractController>] [<CommonParameters>]

wherein the SourceLun parameter specifies the path of the source LUN to be converted, the DestinationVhdx parameter specifies a fully-qualified path to the VHDX file, the Controller parameter specifies the storage system 200 containing the source LUN to be converted and containing connection context needed to execute commands on the storage operating system 222, the BlockSize parameter specifies the VHDX block size to use when creating the VHDX file, and the CommonParameters indicate other commonly used parameters, such as, for example common parameters of Microsoft Windows PowerShell cmdlets.

In an alternative embodiment, the second command (ConvertTo-NaVhdx) may include the following syntax:

ConvertTo-NaVhdx -SourceDiskIndex <UInt32> [[-DestinationVhdx] <String>] [-BlockSize <String>] [-Controller <AbstractController>] [<CommonParameters>]

wherein a SourceDiskIndex parameter is used instead of the SourceLun parameter. In this alternative embodiment, the SourceDiskIndex parameter specifies a VDS disk index of the disk to convert; the second command executes a SCSI inquiry command to retrieve the source LUN path from the storage system. Note that the DestinationVhd, Controller, Block Size, and CommonParameters function as indicated above.

Advantageously, the storage conversion technique provides fast and efficient storage conversion that obviates copying, i.e., reading and writing, of data blocks. That is, instead of reading each data block from the source storage object and writing each read data block to the destination in a proper format, the technique described herein copies the pointers directed to the data blocks of the source storage object to also reference (and share) those data blocks at the destination storage object. As a result, the storage conversion technique substantially reduces input/output operations of the storage system by, e.g., consuming little-to-no additional storage on the system.

While there have been shown and described illustrative embodiments that provide a storage conversion technique for rapidly converting between storage representations served by a storage system and presented to a host computer of a virtualized computing environment, it is to be understood that various other adaptations and modifications may be made within the spirit and scope of the embodiments herein. For example, embodiments have been shown and described herein with relation to physical-to-virtual storage conversion on the storage system. However, the embodiments in their broader sense are not so limited, and may, in fact, enable virtual-to-physical storage conversion.

For example, execution of a third command at the host computer that is used to convert the virtual hard disk (having either VHD or VHDX file format) into the LUN results in physical-to-virtual storage conversion on the storage system. Here, the storage conversion technique determines locations of data blocks and pointers to those blocks within a source storage object (e.g., the virtual hard disk) on a source LUN in a flexible volume 270 of the storage system, and calculates one or more ranges of those data blocks is for the source storage object. Execution of the third command results in the technique calculating and reserving a range of data blocks on the disks for a destination storage object (e.g., the destination LUN) in the same flexible volume 270.

In an embodiment, the third command is illustratively a ConvertTo-NaLun command that is used to convert the virtual hard disk (either VHD or VHDX file format) into the destination LUN and that includes the following exemplary syntax:

ConvertTo-NaLun [-SourceVhd] <String> [-DestinationLun] <String> [-Reserved] [[-Type] <String>] [-Controller <AbstractController>]

wherein the SourceVhd parameter specifies a fully-qualified path to the virtual hard disk file on the source LUN and having the VHD file format to be converted, the DestinationLun parameter specifies a path of the destination LUN, which will contain the virtual hard disk data once the conversion has completed, and the Reserved switch indicates whether or not to enable space reservation on the created (destination) LUN. If the Reserved switch is specified, space reservation is enabled. The Type switch defines the OS type of the created LUN, while the Controller parameter specifies the storage system containing the source LUN to be converted and contains connection context needed to execute commands on the storage operating system. Execution of the third command also results in creation of the destination LUN by, e.g., creating an empty file in the flexible volume 270 on the storage system 200 having a size equal to that of the virtual hard disk file. Note that the size of the destination LUN may be determined by reading metadata of the virtual hard disk file (e.g., either a VHD footer or VHDX metadata).

In an alternative embodiment, the third command (ConvertTo-NaLun) may include the following syntax:

ConvertTo-NaLun -SourceVhdx <String> [-DestinationLun] <String> [-Reserved] [[-Type] <String>] [-Controller <AbstractController>]

wherein the SourceVhdx parameter specifies a fully-qualified path to the virtual hard disk file having the VHDX file format to be converted.

Execution of the third command invokes a third (NTFS) system call requesting, e.g., the size of the virtual hard disk file and creation of the destination LUN, as defined by the parameters of the command. The system call may be forwarded from the host computer 110 as one or more packets over the network 125 and onto the storage system 200, where the packet is received at the network adapter 230 and forwarded to the file system 224 for processing by the processor 210. Upon completion of processing, the storage system 200 returns a reply containing, e.g., the calculated virtual hard disk size and confirmation of creation of the destination LUN to the host computer 110 over the network 125.

In response to receiving the reply, the (NTFS) host file system 120 on the host computer 110 may be consulted to determine the logical block address (LBA) ranges of the VHD file. Note that determination of the LBA ranges is slightly different for VHD and VHDX files. For a VHD file, the contents of substantially all of the file contain data payload except for the last 512 bytes, which are the VHD footer. For VHDX files, the Block Allocation Table may be consulted to determine the data payload region of the VHDX file. The determined region may then be used with the LBA ranges retrieved from the host file system 120 to determine the LBA ranges of the data payload region of the VHDX file. Illustratively, the host file system 120 uses the LBA ranges of the virtual hard disk file in conjunction with the LBA range of the destination LUN to calculate block ranges to supply to the storage system 200 which, in turn, may invoke the block cloning mechanism to manipulate (copy) pointers that essentially clone the data blocks of the VHD file for the destination LUN. As noted, the destination LUN may be considered to have a single (LBA) block range starting at zero with a length of the size of the LUN Once the block ranges have been calculated, a fourth (NTFS) system call is invoked that requests initiation of the block cloning mechanism. The fourth system call may then be forwarded from the host computer 110 as one or more packets over the network 125 and onto the storage system 200, where the appropriate storage operating system command is invoked to perform the block cloning. Illustratively, the storage conversion technique performs the block cloning to copy the pointers directed to the one or more ranges of data blocks for the source (e.g., the virtual hard disk file) so as to also reference the range of data blocks for the destination (e.g., the LUN) in accordance with, e.g., virtual-to-physical storage conversion. After block cloning has completed, the resulting destination LUN is ready for use.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for converting a source storage object for use by a virtual machine at a host computer system executing a host file system, comprising:

generating a command by the host computer system for converting the source storage object representing physical storage of a storage system to a destination storage object representing a virtual storage file for use by the virtual machine to read and write data at storage devices of the storage system, the command parameter specifying a path for the source storage object, identifying a controller at the storage system that manages the source storage object and a path for the destination storage object for use by the virtual machine, and requests a size of the source storage object, wherein the source storage object having a first format includes a set of data blocks on the storage system for storing data and one or more pointers directed to the set of data blocks;

traversing a buffer tree of the source storage object by a file system of the storage system to determine the size of the source storage object;

creating the destination storage object on the storage system within a same storage volume as the source storage object, the destination storage object having a second format different than the first format and a size to store modified data at the destination storage object while preserving unmodified data using the source storage object, wherein the destination storage object including one or more reserved ranges of data blocks according to the file system of the storage system;

providing to the host computer system by the storage system, the size of the source storage object;

determining by the host file system a single source logical block address range of the source storage object and a plurality of destination logical block address ranges for the destination storage object;

using the destination logical block address ranges and the source logical block address range by the host file system to determine data block ranges for the source storage object and the destination storage object;

using the buffer tree by file system of the storage system for copying only the one or more pointers of the source storage object to the destination storage object to reference data blocks of the set of data blocks of the source storage object without having to copy data from data blocks of the source storage object to data blocks of the destination storage object such that a logical sequence of the data blocks in the source storage object is maintained in the destination storage object for providing access to data stored at the data blocks of the source storage object; and configuring the destination storage object to be used with the virtual machine.

2. The method of claim 1 wherein the source storage object is organized as a logical unit number (LUN) and the destination storage object is organized as a virtual disk file for the virtual machine at the host computer system.

3. The method of claim 2 further comprising:
calculating a source range of the set of data blocks of the source storage object by the host file system; and
maintaining by the file system of the storage system a mapping of the source range and the one or more reserved ranges of data blocks of the destination storage object.

4. The method of claim 2, wherein the command has a parameter specifying a block size of the virtual disk file.

5. The method of claim 1 wherein the one or more reserved ranges of data blocks of the destination storage object are organized as clusters of uniform size within a cluster map of the file system.

6. The method of claim 1 wherein in addition to the size of the source storage object, the storage system also provides an operating system type for the source storage object and a confirmation that the destination storage object has been created.

7. A non-transitory machine-readable storage medium having stored thereon instructions for performing a method for converting a source storage object for use by a virtual machine at a host computer system executing a host file system, comprising machine executable code which when executed by at least one machine, causes the machine to:

generate a command by the host computer system for converting the source storage object representing physical storage of a storage system to a destination storage object representing a virtual storage file for use by the virtual machine to read and write data at storage devices of the storage system, where the command parameter specifying a path for the source storage object, identifying a controller at the storage system that manages the source storage object and a path for the destination storage object for use by the virtual machine, and requests a size of the source storage object, wherein the source storage object having a first format includes a set of data blocks on the storage system for storing data and one or more pointers directed to the set of data blocks;

traverse a buffer tree of the source storage object by a file system of the storage system to determine the size of the source storage object;

create the destination storage object on the storage system within a same storage volume as the source storage object, the destination storage object having a second format different than the first format and a size to store modified data at the destination storage object while preserving unmodified data using the source storage object, wherein the destination storage object including one or more reserved ranges of data blocks according to the file system of the storage system;

provide to the host computer system by the storage system, the size of the source storage object;

determine by the host file system a single source logical block address range of the source storage object and a plurality of destination logical block address ranges for the destination storage object;

use the destination logical block address ranges and the source logical block address range by the host file system to determine data block ranges for the source storage object and the destination storage object;

use the buffer tree by file system of the storage system for copying only the one or more pointers of the source storage object to the destination storage object to reference data blocks of the set of data blocks of the source storage object without having to copy data from data blocks of the source storage object to data blocks of the destination storage object such that a logical sequence of the data blocks in the source storage object is maintained in the destination storage object for providing access to data stored at the data blocks of the source storage object; and configure the destination storage object to be used with the virtual machine.

8. The non-transitory machine-readable storage medium of claim 7 wherein the source storage object is organized as a logical unit number (LUN) and the destination storage object is organized as a virtual disk file for the virtual machine at the host computer system.

9. The non-transitory machine-readable storage medium of claim 8 wherein the command has a parameter specifying a block size of the virtual disk file.

10. The non-transitory machine-readable storage medium of claim 7 wherein the one or more reserved ranges of data blocks of the destination storage object are organized as clusters of uniform size within a cluster map of the file system.

11. The non-transitory machine-readable storage medium of claim 7 wherein in addition to the size of the source storage object, the storage system also provides an operating system type for the source storage object and a confirmation that the destination storage object has been created.

12. The non-transitory machine-readable storage medium of claim 7 further causes the machine to:
calculate a source range of the set of data blocks of the source storage object by the host file system; and
maintain by the file system of the storage system a mapping of the source range and the one or more reserved ranges of data blocks of the destination storage object.

13. A system for converting a source storage object for use by a virtual machine at a host computer system executing a host file system, comprising:
a memory containing machine readable medium comprising machine executable code having stored thereon instructions; and a processor coupled to the memory to execute the machine executable code to:
generate a command by the host computer system for converting the source storage object representing physical storage of a storage system to a destination storage object representing a virtual storage file for use by the virtual machine to read and write data at storage devices of the storage system, where the command parameter specifying a path for the source storage object, identifying a controller at the storage system that manages the source storage object and a path for the destination storage object for use by the virtual machine, and
requests a size of the source storage object, wherein the source storage object having a first format includes a set of data blocks on the storage system for storing data and one or more pointers directed to the set of data blocks;
traverse a buffer tree of the source storage object by a file system of the storage system to determine the size of the source storage object;
create the destination storage object on the storage system within a same storage volume as the source storage object, the destination storage object having a second format different than the first format and a size to store modified data at the destination storage object while preserving unmodified data using the source storage object, wherein the destination storage object including one or more reserved ranges of data blocks according to the file system of the storage system;
provide to the host computer system by the storage system, the size of the source storage object;
determine by the host file system a single source logical block address range of the source storage object and a plurality of destination logical block address ranges for the destination storage object;
use the destination logical block address ranges and the source logical block address range by the host file system to determine data block ranges for the source storage object and the destination storage object;
use the buffer tree by file system of the storage system for copying only the one or more pointers of the source storage object to the destination storage object to reference data blocks of the set of data blocks of the source storage object without having to copy data from data blocks of the source storage object to data blocks of the destination storage object such that a logical sequence of the data blocks in the source storage object is maintained in the destination storage object for providing access to data stored at the data blocks of the source storage object; and
configure the destination storage object to be used with the virtual machine.

14. The system of claim 13 wherein the source storage object is organized as a logical unit number (LUN) and the destination storage object is organized as a virtual disk file for the virtual machine at the host computer system.

15. The system of claim 13 wherein the one or more reserved ranges of data blocks of the destination storage object are organized as clusters of uniform size within a cluster map of the file system.

16. The system of claim 13 wherein in addition to the size of the source storage object, the storage system also provides an operating system type for the source storage object and a confirmation that the destination storage object has been created.

17. The system of claim 13 further causes the processor to:
calculate a source range of the set of data blocks of the source storage object by the host file system; and
maintain by the file system of the storage system a mapping of the source range and the one or more reserved ranges of data blocks of the destination storage object.

* * * * *